D. Henderson,
Furniture Caster.
Nº 41,919. Patented Mar. 15, 1864.
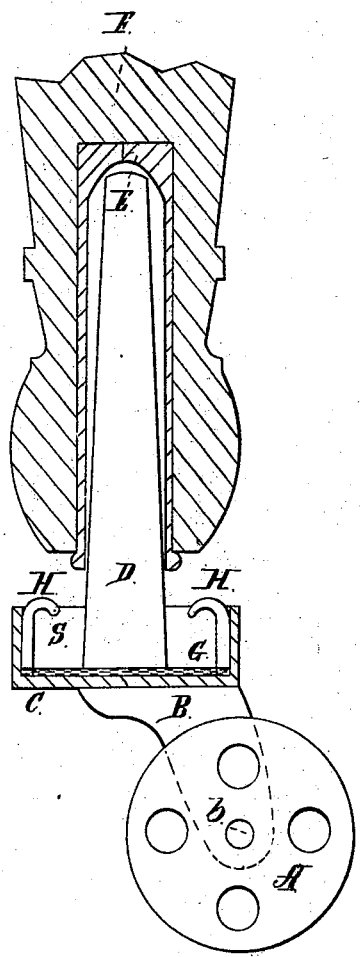
Witnesses:
N. Ames,
James W. Rollins.
Inventor:
David Henderson

UNITED STATES PATENT OFFICE.

DAVID HENDERSON, OF BOSTON, MASSACHUSETTS.

IMPROVED TRAP-CASTER FOR BEDSTEADS.

Specification forming part of Letters Patent No. 41,919, dated March 15, 1864.

*To all whom it may concern:*

Be it known that I, DAVID HENDERSON, of Boston, in the county of Suffolk and Commonwealth of Massachusetts, have invented a new and useful Bug-Trap Caster for Bedsteads; and I do hereby declare that the following is a full, clear, and exact description of the construction and operation of the same, reference being had to the accompanying drawing, forming a part of this specification.

The drawing is full size, and represents a central vertical section through the caster and the lower end of a bedstead-post The nature of my invention consists, first, in forming around the base of the vertical pin D, which enters the leg of a bedstead, a trou or channel, S, for the reception of oil or other suitable substance, G, to destroy bed-bugs and other creeping insects, and prevent them from ascending from the carpet or floor of a room to the bedstead and bed; and second, in providing the inside of the trough S with a coating of enamel or a ring of glass, tin, or other smooth and polished substance, on which a bug will slip.

To enable others skilled in the art to make and use my invention, I will now proceed to describe its construction and operation.

A is the wheel, turning on the axle $b$ in the arms B in the usual manner. The shank or vertical pin D is also similar to those in general use, and is made to enter and revolve freely in the two-part iron casing E in the bottom of the post F, as in other casters.

I make the trough S about one-half inch deep by one inch and three-fourths in diameter, the shank or vertical pin D rising from its center, as represented in the drawing. The inside of this trough or channel S, as well as the lower part of the shank D, I propose to coat with enamel or provide with a lining of glass, tin, or other smooth and polished substance, H, on which a bug will slip in attempting to crawl, and thereby be more certain to fall into the oil or liquid G. I also propose to turn down the top of the lining H, as shown in the drawing, so that the bugs will be more likely to drop into the liquid in attempting to reach the bed-post. I do not, however, consider either the enamel or the lining H as absolutely essential, since a simple cast-iron trough provided with a suitable oil or liquid is very effectual in preventing bugs and creeping insects from reaching a bed from the floor or carpet of a room.

The trough or channel S being cast in a single piece with the shank D and arms B, it follows that my caster costs but a mere trifle more than other kinds in general use, and may be readily applied to any bedstead as a substitute for them.

Having thus described the construction and operation of my improvement, what I claim as new, and desire to secure by Letters Patent, is—

As a new article of manufacture, a furniture-caster with the arms B, liquid-cup G, and spindle D, castin a single piece, substantially as and for the purpose described.

DAVID HENDERSON.

Witnesses:
N. AMES,
JAMES W. ROLLINS.